Patented Apr. 13, 1937

2,076,917

UNITED STATES PATENT OFFICE 2,076,917

WEED KILLING PREPARATIONS

Georg Pfuetzer and Hermann Losch, Limburgerhof, Germany, assignors to I. G. Farbenindustrie Aktiengesellschaft, Frankfort - on - the-Main, Germany No Drawing. Application August 25, 1933, Serial No. 686,772. In Germany September 3, 1932

6 Claims. (Cl. 71—4)

The present invention relates to weed-killing preparations and process of producing same.

For the purpose of killing weeds it has already been proposed to make use of heavy metal salts, as for example ferrous sulphate, which are strewn on the plants to be destroyed. This method has not, however, found application in practice, probably owing to the fact that the crystalline heavy metal compounds do not remain on the leaves of the plants to be destroyed but fall down to the soil and thus cannot act on the weeds.

We have now found that weed-killing preparations free from the aforesaid objection are intimate mixtures of a heavy metal salt which is soluble in water with ammonium chloride in a highly dispersed form, i. e. in the form of a very fine powder or in aqueous solution. Heavy metal salts suitable for the purposes of the present invention are for example the water-soluble salts of copper, iron, nickel, cobalt, mercury and zinc. Of these the salts of copper and iron are particularly valuable. The said heavy metal salts may be used either in a wholly or partly dehydrated state or while containing the usual amounts of water of crystallization. In the preparations according to the present invention not only the heavy metal salts but also the ammonium chloride has a detrimental action on the weeds. The preparations have the advantage that they are also capable of supplying nitrogen to the soil and to the valuable plants which are not destroyed.

The preparations in accordance with the present invention can be obtained without difficulty in a form in which they are as dry as dust. If necessary they may be ground to powder in suitable mills. When the preparations are strewed on the field, the fine particles firmly adhere to the weeds to be destroyed and thus have a very strong action thereon. In order to improve the capacity of the preparations for being stored, additions of kieselguhr, active carbon, finely ground coal, of china clay, burnt gypsum or dried mud may be made. In order to increase the fertilizing action of the preparations on the valuable plants it may be desirable to add other fertilizing salts to the preparations, especially such as contain nitrogen in a form in which it is readily and rapidly taken up by the plants. An addition of such other salts may also improve the capacity of the preparations according to the present invention for being stored. For example in the case of a preparation made up from ferrous sulphate and ammonium chloride it may be advantageous to add some ammonium sulphate and correspondingly to reduce the amount of ammonium chloride present. In order to prevent the soil becoming too acid by reason of the employment of the weed-killing preparations it may be desirable also to add substances such as calcium carbonate. If desired agents capable of killing vermin may also be added to the preparations.

The amounts of heavy metal salts used in connection with a given amount of ammonium chloride may vary within wide limits. They depend, on the one hand, on the efficiency of the heavy metal salt used for weed-killing purposes and, on the other hand, also on the amount of nitrogen which may be supplied to the soil in the form of ammonium chloride. Regard must also be had to the stability of the preparations in storage. For example, when using copper sulphate, which may be employed either in the usual, hydrated form or in a dehydrated state, at least 5 per cent by weight of the ammonium chloride and preferably between 5 and 10 per cent will be employed. Thus, very suitable mixtures are those containing from 2 to 15 parts of hydrated copper sulphate, from 40 to 98 parts of ammonium chloride, and if desired from 4 to 40 parts of limestone, gypsum, kieselguhr or siliceous residues. In the case of ferrous sulphate which is preferably used in the form containing only one molecule of water of crystallization per molecule of anhydrous salt, because otherwise unstable mixtures are obtained, it is most suitable to use from 30 to 50 per cent of ferrous sulphate calculated by weight of the finished mixture. Such mixtures may be composed, for example of from 10 to 75 parts of ferrous sulphate containing only one molecule of water of crystallization, from 25 to 90 parts of ammonium chloride and up to 40 parts of limestone, gypsum, kieselguhr or siliceous residues. If desired, part of the ammonium chloride may be replaced by another nitrogenous salt such as ammonium sulphate or sodium nitrate; 20 per cent by weight of ammonium chloride should, however, at least be present in the finished mixture.

As has already been pointed out it is often advisable to remove from the heavy metal salts part or all of the water of crystallization. This may be effected by subjecting the heavy metal salts to a heat-treatment whereby water of crystallization is disengaged or by allowing the salts to form directly in a state free from or low in water of crystallization, as for example by separating them from solutions in the presence of dehydrating agents such as concentrated acids or by bringing together the components forming the said salts in the absence of such amounts of water as would be sufficient for the formation of crystals rich in water of crystallization. The heavy metal salts may also be obtained in a solid state together with the ammonium chloride as for example by evaporating aqueous solutions containing both salts. The mixtures of the heavy metal salts with ammonium chloride may also be prepared by bringing together the components of each salt under conditions under which salt formation takes place. Instead of or in addition to the heavy metal salts use may also be made of heavy metal hydroxides or oxides, especially such as have been prepared at as low temperatures as possible.

The following examples will further illustrate the nature of the present invention which, however, is not limited to these examples. The parts are by weight.

*Example 1*

A saturated aqueous solution of ferrous sulphate is heated to between 70° and 80° C. Ferrous sulphate containing only one molecular proportion of water of crystallization is precipitated. This salt is then finely ground and intimately mixed with its own weight of finely ground ammonium chloride. A powder is obtained which can be strewn without difficulty and which is very suitable for killing weeds such as wild mustard or wild radish.

The action of this preparation against wild mustard and wild radish is shown in the following table in which its action is compared with that of crude calcium cyanamide. In the experiments indicated in this table the wild mustard and wild radish plants had become rather strong as a consequence of rainy weather when the treatment was applied.

|  | Kilogram N per hectare | Number of blossoming wild mustard and wild radish plants on 4 square metres of soil. | |
| --- | --- | --- | --- |
|  |  | Experiment No. 1 | Experiment No. 2 |
| Untreated | | 842 | 1,172 |
| Calcium cyanamide | 40 | 199 | 430 |
| $NH_4Cl + FeSO_4.H_2O$ 1:1 | 30 | 16 | 174 |

A composition which is still more suitable may be composed of 23 parts of ammonium chloride, 26.4 parts of ammonium sulphate, 27.8 parts of ferrous sulphate with 1 molecule of water of crystallization and 22.8 parts of limestone. A mixture of this kind may be prepared by introducing ferrous sulphate and limestone at 80° C. into a melt composed of ammonium chloride, ammonium sulphate and a few per cent of water, filtering off the salt mixture, drying and grinding it, or also by grinding a mixture of the dry components.

*Example 2*

A mixture is prepared from 83 parts of ammonium chloride, 5 parts of anhydrous copper sulphate and, if desired, 12 parts of limestone. The resulting preparation may be used in the manner described in Example 1 for killing weeds such as wild mustard.

*Example 3*

83 parts of ammonium chloride, 12 parts of ground limestone and 5 parts of copper sulphate ($CuSO_4.5H_2O$) are made into a paste with water and thoroughly mixed. The mixture is dried at 120° C. and ground until the particles have a size of 0.3 millimetre. The product may be applied in an amount of 175 kilograms per hectare corresponding to 35 kilograms of nitrogen.

A preparation made in the manner described consisting of 5 parts of copper sulphate $$(CuSO_4.5H_2O),$$

32 parts of ground limestone and 63 parts of ammonium chloride has also proved suitable for killing weeds when applied in an amount corresponding to 40 kilograms of nitrogen per hectare.

*Example 4*

50 parts of ferrous sulphate ($FeSO_4.H_2O$) are mixed with 25 parts of sodium nitrate and 25 parts of ammonium chloride, and the mass is thoroughly ground.

In the same manner a weed-killing preparation consisting of 34 parts of ferrous sulphate, 10 parts of ground limestone, 27 parts of ammonium chloride and 29 parts of ammonium sulphate is made which may be applied in an amount corresponding to 40 kilograms of nitrogen per hectare.

*Example 5*

45 parts of ammonium chloride, 50 parts of kieselguhr and 5 parts of copper sulphate $$(CuSO_4.5H_2O)$$

are made into a paste with water and thoroughly mixed. The mixture is dried at 120° C. and ground.

*Example 6*

62.5 parts of ammonium chloride and 5 parts of copper sulphate ($CuSO_4.5H_2O$) are made into a paste with 20 parts of water, and 32.5 parts of brown coal are added. The mass is thoroughly mixed, dried at about 100° C. until the particles have a size of 0.25 millimetre.

The following mixtures in a highly dispersed form have further proved suitable for killing weeds, in particular wild mustard and wild radish plants:

35 parts of ammonium chloride, 25 parts of ammonium nitrate sulphate, 5 parts of copper sulphate ($CuSO_4.5H_2O$) and 35 parts of brown coal;

25 parts of ammonium chloride, 55 parts of sodium nitrate and 20 parts of ferric chloride;

35 parts of ammonium chloride, 40 parts of sodium nitrate, 10 parts of copper sulphate ($CuSO_4.5H_2O$) and 15 parts of brown coal;

23 parts of ammonium chloride, 70 parts of potassium nitrate, 3 parts of copper chloride and 4 parts of brown coal;

50 parts of ammonium chloride, 45 parts of kainite and 5 parts of copper sulphate $$(CuSO_4.5H_2O);$$

90 parts of a mixture of ammonium chloride and potassium nitrate obtained by the conversion of ammonium nitrate and potassium chloride, containing in total about 16 per cent of nitrogen of which about 8 per cent is ammonia-nitrogen, about 28 per cent $K_2O$ and about 26 per cent Cl, 2.5 parts of copper chloride and 7.5 parts of brown coal.

What we claim is:

1. Weed-killing preparations in a highly dispersed form containing at least 20 per cent by weight of ammonium chloride and a water-soluble heavy metal salt.

2. Weed-killing preparations in a highly dispersed form containing at least 20 per cent by weight of ammonium chloride and a water-soluble heavy metal salt selected from the group consisting of copper and iron salts.

3. Weed-killing preparations in a highly dispersed form containing at least 20 per cent by weight of ammonium chloride and copper sulphate.

4. Weed-killing preparations in a highly dispersed form containing at least 20 per cent by weight of ammonium chloride and between 5 and 10 per cent by weight of copper sulphate calculated on the amount of ammonium chloride.

5. Weed-killing preparations in a highly dispersed form containing at least 20 per cent by weight of ammonium chloride and monohydrated ferrous sulphate.

6. Weed-killing preparations in a highly dispersed form containing at least 20 per cent by weight of ammonium chloride and from 30 to 50 per cent by weight of monohydrated ferrous sulphate.

GEORG PFUETZER.
HERMANN LOSCH.